United States Patent
Bowman et al.

(10) Patent No.: US 10,621,288 B2
(45) Date of Patent: Apr. 14, 2020

(54) INTEROPERABLE HIERARCHICAL MODEL FOR CONDUCTING MULTIUSER CAX OPERATIONS

(71) Applicant: Brigham Young University, Provo, UT (US)

(72) Inventors: Kelly Eric Bowman, Provo, UT (US); Joshua Coburn, Orem, UT (US); Charles Greg Jensen, Provo, UT (US)

(73) Assignee: BRIGHAM YOUNG UNVERSITY, Provo, UT (US)

( * ) Notice: Subject to any disclaimer, the term of this patent is extended or adjusted under 35 U.S.C. 154(b) by 655 days.

(21) Appl. No.: 14/738,708

(22) Filed: Jun. 12, 2015

(65) Prior Publication Data

US 2016/0019314 A1     Jan. 21, 2016

Related U.S. Application Data (60) Provisional application No. 62/011,441, filed on Jun. 12, 2014, provisional application No. 62/011,424, filed on Jun. 12, 2014.

(51) Int. Cl.
    *G06F 17/30*        (2006.01)
    *G06F 17/50*        (2006.01)

(52) U.S. Cl.
    CPC .......... *G06F 17/50* (2013.01); *G06F 2217/04* (2013.01)

(58) Field of Classification Search
    CPC ...................... G06F 17/30958; G06F 17/30867
    USPC ....................................................... 707/798
    See application file for complete search history.

(56) References Cited

U.S. PATENT DOCUMENTS

| | | | |
|---|---|---|---|
| 6,377,939 B1 * | 4/2002 | Young | G06Q 30/04 705/34 |
| 9,648,059 B2 * | 5/2017 | Nysetvold et al. | 709/204 |
| 2001/0047251 A1 * | 11/2001 | Kemp | G06F 17/5004 703/1 |
| 2004/0111406 A1 * | 6/2004 | Udeshi | G06F 17/30961 |
| 2007/0018980 A1 * | 1/2007 | Berteig | G06T 15/80 345/426 |
| 2007/0180067 A1 * | 8/2007 | Schiffer | H04L 41/0803 709/220 |
| 2009/0006797 A1 * | 1/2009 | Bagal | G06F 21/6227 711/164 |
| 2012/0143570 A1 * | 6/2012 | Austin | G06Q 10/00 703/1 |
| 2012/0173243 A1 * | 7/2012 | Anand | H04M 3/4936 704/270.1 |
| 2012/0317497 A1 * | 12/2012 | Red | G06F 17/50 715/751 |

(Continued)

*Primary Examiner* — Anh Ly
(74) *Attorney, Agent, or Firm* — Kunzler Bean & Adamson (57) ABSTRACT

A computer-implemented method for an interoperable hierarchical model for conducting multiuser CAx OPERATIONS may include (1) storing a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph, (2) indicating an operational order for each data node that has a common parent, and (3) executing in the indicated operational order a CAx-related function for each data node. Various other methods and systems are also disclosed.

14 Claims, 9 Drawing Sheets

(56) References Cited

U.S. PATENT DOCUMENTS

| | | | |
|---|---|---|---|
| 2013/0239011 A1* | 9/2013 | Red | G06F 17/50 715/743 |
| 2014/0188437 A1* | 7/2014 | Red | G06F 17/5018 703/1 |
| 2014/0222386 A1* | 8/2014 | Cannon | G06F 17/5018 703/1 |
| 2014/0222387 A1* | 8/2014 | Cannon | G06F 17/5018 703/1 |
| 2014/0222919 A1* | 8/2014 | Nysetvold et al. | 709/204 |
| 2014/0236550 A1* | 8/2014 | Nysetvold et al. | 703/2 |
| 2014/0317531 A1* | 10/2014 | Bowman, Jr. | H04L 65/403 715/751 |
| 2015/0199454 A1* | 7/2015 | Hepworth | G06F 17/50 703/1 |
| 2016/0019314 A1* | 1/2016 | Bowman | G06F 17/50 707/798 |

\* cited by examiner

INTEROPERABLE HIERARCHICAL MODEL FOR CONDUCTING MULTIUSER CAX OPERATIONS

CROSS-REFERENCE TO RELATED APPLICATIONS

This application claims the benefit of U.S. provisional application 62/011,441 entitled "Interoperable Hierarchical Graphs" and filed on 12 Jun. 2014 and U.S. provisional application 62/011,424 entitled "Geometry Culling for Large Assembly Scalability" and filed on 12 Jun. 2014. The foregoing applications are incorporated herein by reference.

BACKGROUND

The subject matter disclosed herein relates to computer aided technologies (CAx) such as computer aided design, engineering, analysis and manufacture in general and apparatus, systems, means, and methods for multi-user CAx editing in particular.

Large design and engineering projects require coordination of the efforts of many designers or engineers, and efficient utilization of their efforts calls for multi-user CAx systems that allow designers and engineers to simultaneously work on a model. The terms "model of an engineering object" and "CAx model" as used herein generally refer to a set of data structures that represent the design of an object, system, or process. CAx models may include, without limitation, electronic data representing design objects such as two-dimensional objects, three-dimensional objects, and/or processes. CAx models may also include parameters, components, drawings, images, and/or specifications associated with a design object. CAx models may facilitate creation, modification, analysis, simulation, optimization, and/or manufacture of design objects. Typically, CAx models contain many hierarchical data structures. Features within parts within assemblies within the model may form a complex hierarchy of dependencies.

Existing CAx systems, however, are not well-suited to multi-user design and editing. For example, various CAx systems may have different views of the model and different, potentially incompatible, approaches to representing the hierarchy of features, parts, and assemblies within the model. A related issue is that the data hierarchy within a design model may lead to significant delays in the design and engineering process while CAx systems render views of the model.

Given the foregoing, what is needed is additional and improved systems and methods for computer-assisted design and analysis of engineering objects, in particular, systems and methods for conducting multiuser CAx operations. The embodiments disclosed herein were developed in response to these issues.

SUMMARY OF THE INVENTION

As will be described in greater detail below, the subject matter disclosed herein describes various systems and methods for providing an interoperable hierarchical model for conducting multiuser CAx operations. In one example, a computer-implemented method for providing an interoperable hierarchical model for conducting multiuser CAx operations, executed by one or more processors, includes: (1) storing a model of an engineering object in a data nodes that are interconnected with dependency references that specify one or more parent nodes for each non-root node of the data nodes, the data nodes and the dependency references corresponding to a directed acyclic graph, (2) indicating an operational order for each data node that has a common parent, and (3) executing in the indicated operational order a CAx-related function for each data node.

In one embodiment, the model is stored on a server and a client requests a particular position within the operational order. In some examples, indicating an operational order may include storing a priority level. In some examples, the computer-implemented method may further include executing a dependency-related function according to the dependency references. In one embodiment, the dependency-related function may include checking for potential conflicts. In one embodiment, data nodes that do not have a common parent are determined to not have a potential conflict.

In one embodiment, each dependency reference may include one or more of a pointer, a handle, and an index. In one embodiment, the CAx-related function may include graphically rendering at least a portion of the model of the engineering object. In some examples, rendering the portion of the model may include culling at least one data node of a node not being edited and/or culling at least one data node that is a child of a node not being edited.

In one embodiment, a system for implementing the above-described method may include several modules stored in memory, such as (1) a storage module that stores a model of an engineering object in a data nodes that are interconnected with a dependency references that specify one or more parent nodes for each non-root node of the data nodes, the data nodes and the dependency references corresponding to a directed acyclic graph, (2) an ordering module that indicates an operational order for each data node that has a common parent, and (3) an operation module that executes in the indicated operational order a CAx-related function for each data node. The system may also include at least one physical processor configured to execute the storage module, the ordering module, and the operation module.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present disclosure is generally directed to systems and methods for an interoperable hierarchical model for conducting multiuser CAx operations. As will be explained in greater detail below, systems and methods described herein may build and maintain a hierarchical model for engineering objects that provides a build-dependent hierarchy that enables interoperation with CAx systems based on a build-independent hierarchy or a non-hierarchical model. The hierarchical model may also provide for efficient rendering of views of an engineering object.

Figure 1:
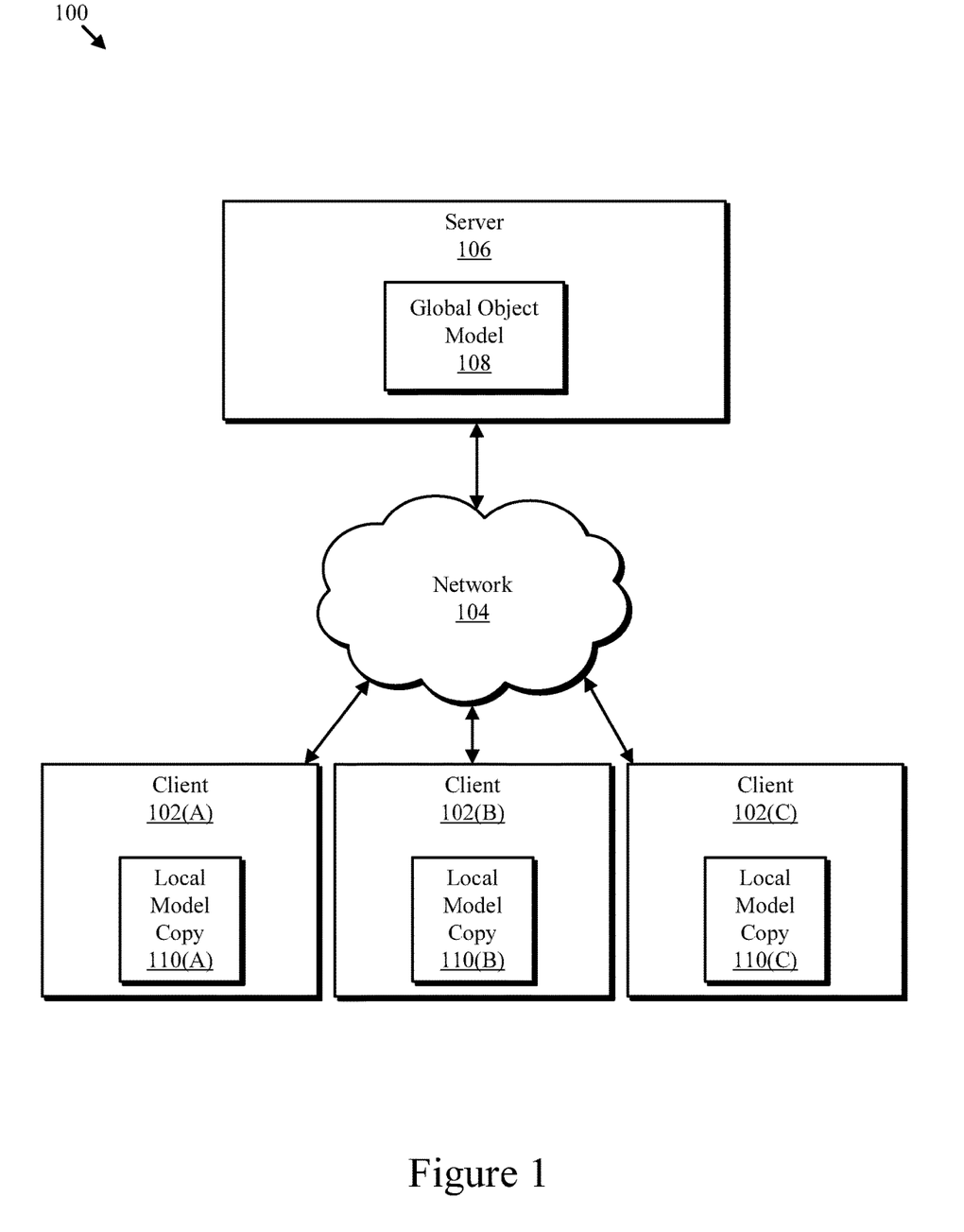
FIG. 1 is a schematic drawing of a system for an interoperable hierarchical model for conducting multiuser CAx operations in accordance with at least one embodiment of the present invention.
Figure 2:
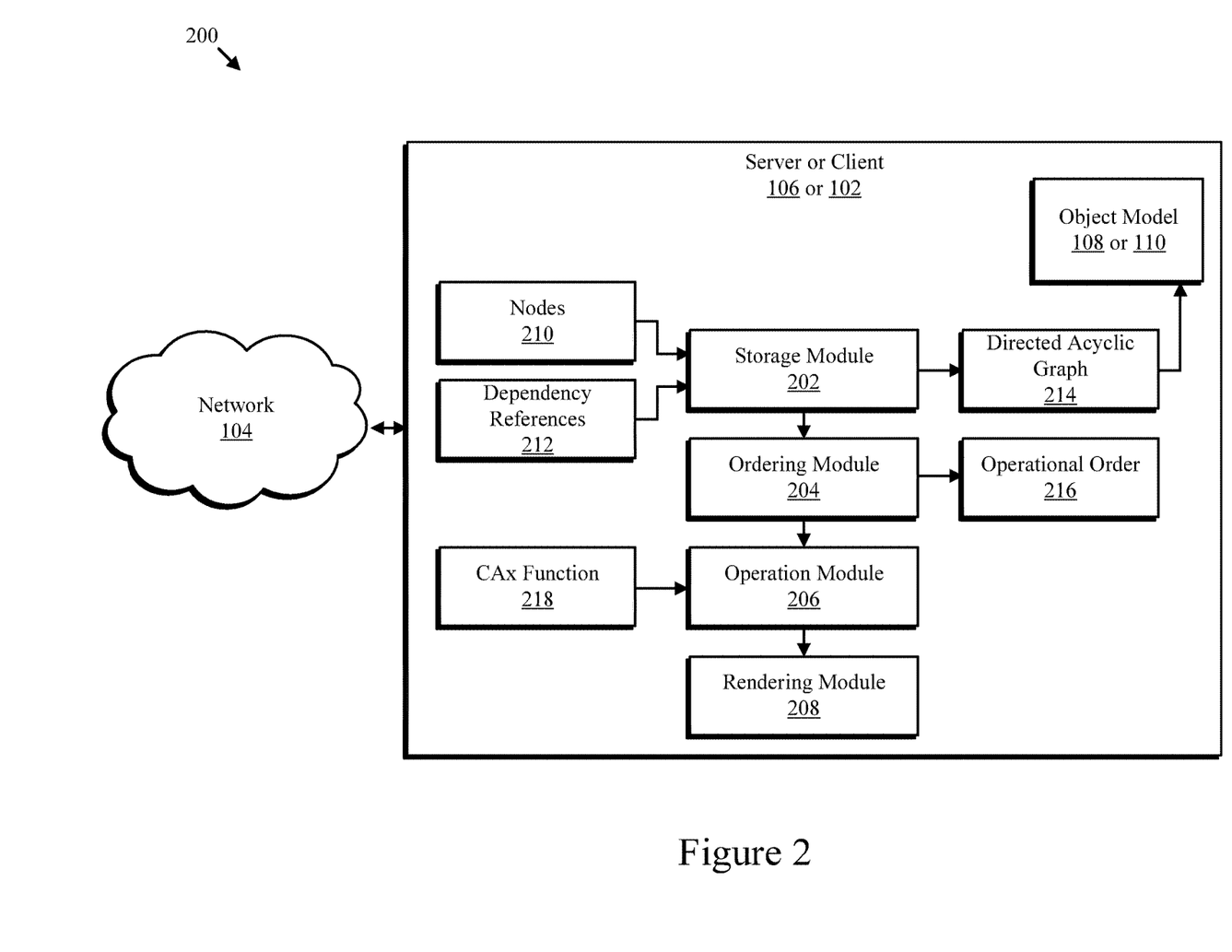
FIG. 2 is a functional block diagram depicting one embodiment of the system for an interoperable hierarchical model for conducting multiuser CAx operations.

The following will provide, with reference to FIGS. 1, and 2, detailed descriptions of example systems for an interoperable hierarchical model for conducting multiuser CAx operations. Detailed descriptions of corresponding computer-implemented methods will also be provided in connection with FIGS. 3 and 4. Specific examples of CAx operations that leverage the disclosed systems and methods are presented in FIGS. 5-9.

FIG. 1 is a schematic drawing of a system 100 wherein multi-user CAx editing may be deployed. As illustrated in this figure, system 100 may include one or more clients 102, a network 104, and a server 106. Server 106 may host a shared (i.e., global) object model 108. Clients 102 may host local model copies 110 that include at least of portion of object model 108.

Clients 102 generally represent any type or form of computing device capable of reading computer-executable instructions. Examples of clients 102 include, without limitation, laptops, tablets, desktops, servers, combinations of one or more of the same, or any other suitable computing device.

Server 106 generally represents any type or form of computing device or combinations of computing devices that is capable of storing, comparing, and/or providing data, as well as providing back-end processing services. Server 106 may represent a commercial or publicly-accessible service or a service provided to a single organization. Examples of server 106 include, without limitation, high-performance clusters, virtual machines, application servers, web servers, and/or database servers configured to provide various database services and/or run software applications, or combinations of one or more of the same.

In certain embodiments, server 106 may represent combinations of software applications and physical computing systems configured to perform various tasks. For example, server 106 may include a database server that manages one or more databases, such as global object model 108. In one example, object model 108 may be configured to store geometry, material, load, and/or environment data representing one or more design models. Object model 108 may represent portions of a single database or computing device or a plurality of databases or computing devices capable of being accessed by computing devices included in server 106 and/or clients 102.

Network 104 generally represents any medium or architecture capable of facilitating communication or data transfer. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 104 may facilitate communication or data transfer using wireless or wired connections. In one embodiment, network 104 may facilitate communication between clients 102 and server 106.

FIG. 2 is a functional block diagram depicting one embodiment of a system 200 for providing an interoperable hierarchical model for conducting multiuser CAx OPERATIONS. As illustrated in this figure, system 200 may include a client 102 that may include local model copy 110 or a server 106 with a global copy 108, as well as one or more modules for performing one or more tasks. For example, and as will be explained in greater detail below, system 200 may include a storage module 202 that may store a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph. Ordering module 204 may indicate an operational order for each data node that has a common parent. Operation module 206 may execute in the indicated operational order a CAx-related function for each data node. Rendering module 208 may render a portion of the model of the engineering object. The system 200 is one particular embodiment of the system 100.

Figure 3:
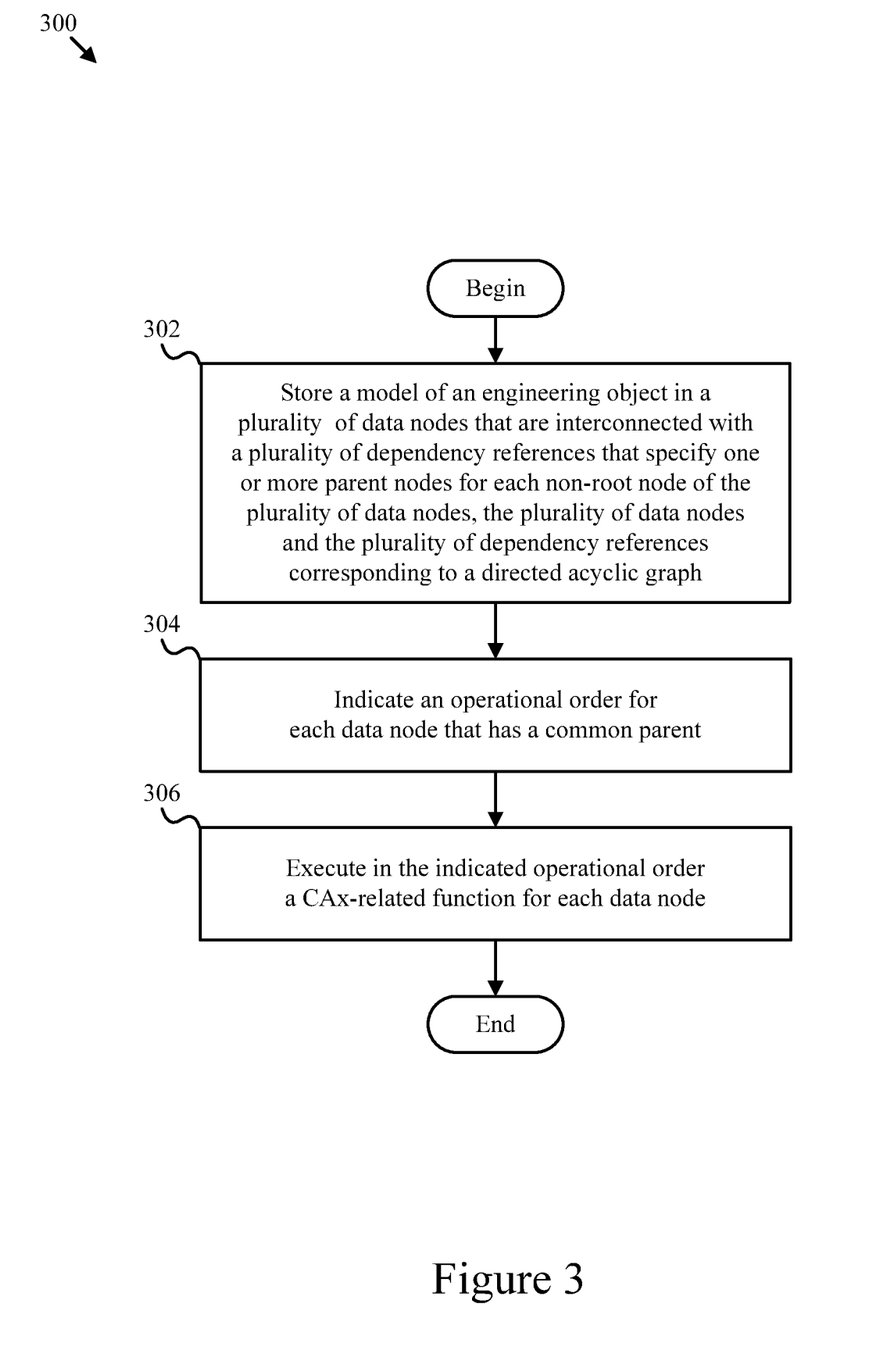
FIG. 3 is a flowchart diagram depicting one embodiment of a method for providing an interoperable hierarchical model for conducting multiuser CAx Operations.

FIG. 3 is a flow diagram of an example computer-implemented method 300 for providing an interoperable hierarchical model for conducting multiuser CAx OPERATIONS. The steps shown in FIG. 3 may be performed by any suitable computer-executable code and/or computing system. In some embodiments, the steps shown in FIG. 3 (as well as FIG. 4) may be performed by the server 106, one or more clients 110, or partitioned across the server 106 and one or more clients 110.

As illustrated in FIG. 3, at step 302, one or more of the systems described herein may store a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph. For example, storage module 202 may, as part of computing device server 106 or client 100, store a model of an engineering object in a plurality of data nodes 210 that are interconnected with a plurality of dependency references 212 that specify one or more parent nodes for each non-root node of the plurality of data nodes 210, the plurality of data nodes 210 and the plurality of dependency references 212 corresponding to a directed acyclic graph 214.

The term "data nodes," as used herein, generally refers to elements in a design model hierarchy that represent features, parts, assemblies or functions that operate on these elements. The term "dependency references," as used herein, generally refers to parent-child relationships between nodes in the design model hierarchy, represented in a graph of the design model by edges connecting the nodes. The term "directed acyclic graph," as used herein, generally refers to a representation of the data nodes of the design model hierarchy, connected by edges representing the dependency references.

Storage module 202 may store the model of the engineering object in a variety of ways. For example, storage module 202 may include in the data structure representing each node a reference to the node's parent node. As will be described in greater detail below, storage module 202 may also include in the data structure representing each node an index that may be used to store the build order for multiple child nodes of a common parent. In one embodiment, each dependency reference may include one or more of (1) a pointer, (2) a handle, and/or (3) an index.

Figure 4:
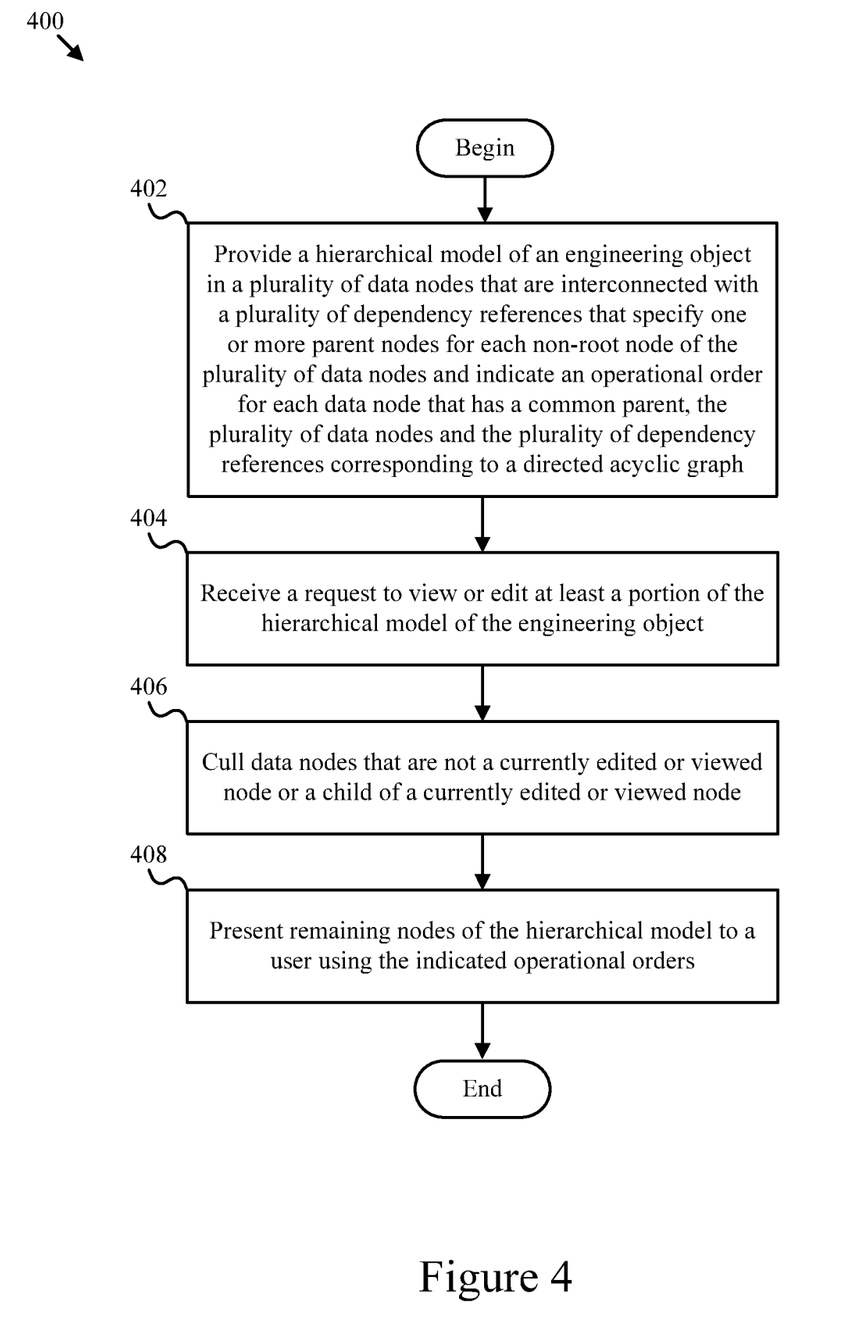
FIG. 4 is a flowchart diagram depicting one embodiment of a method for rendering an interoperable hierarchical model for conducting multiuser CAx Operations.

FIG. 4 is a flow diagram of a computer-implemented method 300 for rendering an interoperable hierarchical model for conducting multiuser CAx OPERATIONS. As depicted, the method includes providing (402) a hierarchical model, receiving (404) a request to view or edit at least a portion of the hierarchical model, culling (406) data nodes, and presenting (408) remaining nodes using the indicated operational orders. The method 400 may be conducted the server 106, one or more clients 110, or partitioned across the server 106 and one or more clients 110.

Providing (402) a hierarchical model may include storing a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph. For example, storage module 202 may, as part of computing device client 102 or server 106 in FIG. 2, store a model of an engineering object in a plurality of data nodes 210 that are interconnected with a plurality of dependency references 212 that specify one or more parent nodes for each non-root node of the plurality of data nodes 210, the plurality of data nodes 210 and the plurality of dependency references 212 corresponding to a directed acyclic graph 214.

As in step 302 in FIG. 3, storage module 202 may store the model of the engineering object in a variety of ways. For example, storage module 202 may include in the data structure representing each node a reference to the node's parent node. Storage module 202 may also include in the data structure representing each node an index that may be used to store the build order for multiple child nodes of a common parent. Each dependency reference may include one or more of (1) a pointer, (2) a handle, and/or (3) an index.

Receiving (404) a request to view or edit at least a portion of the hierarchical model may include receiving a request to render at least a portion of the model of the engineering object. For example, rendering module 208 may, as part of client 102 or server 106 in FIG. 2, receive a request from client 102 to render a portion of object model 108. Rendering module 208 may receive the request to render a portion of the engineering object in a variety of ways. For example, user of a CAx system may select an assembly or part for rendering. The CAx system may identify the subtree of the hierarchical model representing the assembly or part to rendering module 208, along with parameters of the view to be rendered. Rendering may take place on the client or server, depending on whether the client database has the portion of the model hierarchy containing the subtree for the selected part or assembly.

Culling (406) data nodes may include culling nodes that are not a currently edited or viewed node or a child of a currently edited or viewed node. Server 106 may pre-cull elements related to a view, such that elements that are fully contained within another bounding box are culled. The server may store views of features, parts, and/or assemblies in the database with non-visible elements pre-culled. Doing so would enable the server to provide a view of each feature, part, or assembly without the time and processing overhead associated with rendering the view at the time the view is requested.

The server may also store a simplified view of features, parts, and/or assemblies, so that users may be presented with a simplified view of elements they are not permitted to interact with. For example, a user may not be permitted to obtain a detailed view of an element restricted under the International Traffic in Arms Regulations (ITAR) laws. The server may provide users restricted under ITAR with a compliant, simplified view of the restricted elements.

Presenting (408) remaining nodes may include presenting a graphical rendering of the remaining nodes to a user. The graphical rendering may be generated using the indicated operational orders in order to maintain integrity of the hierarchical model.

Figure 5:
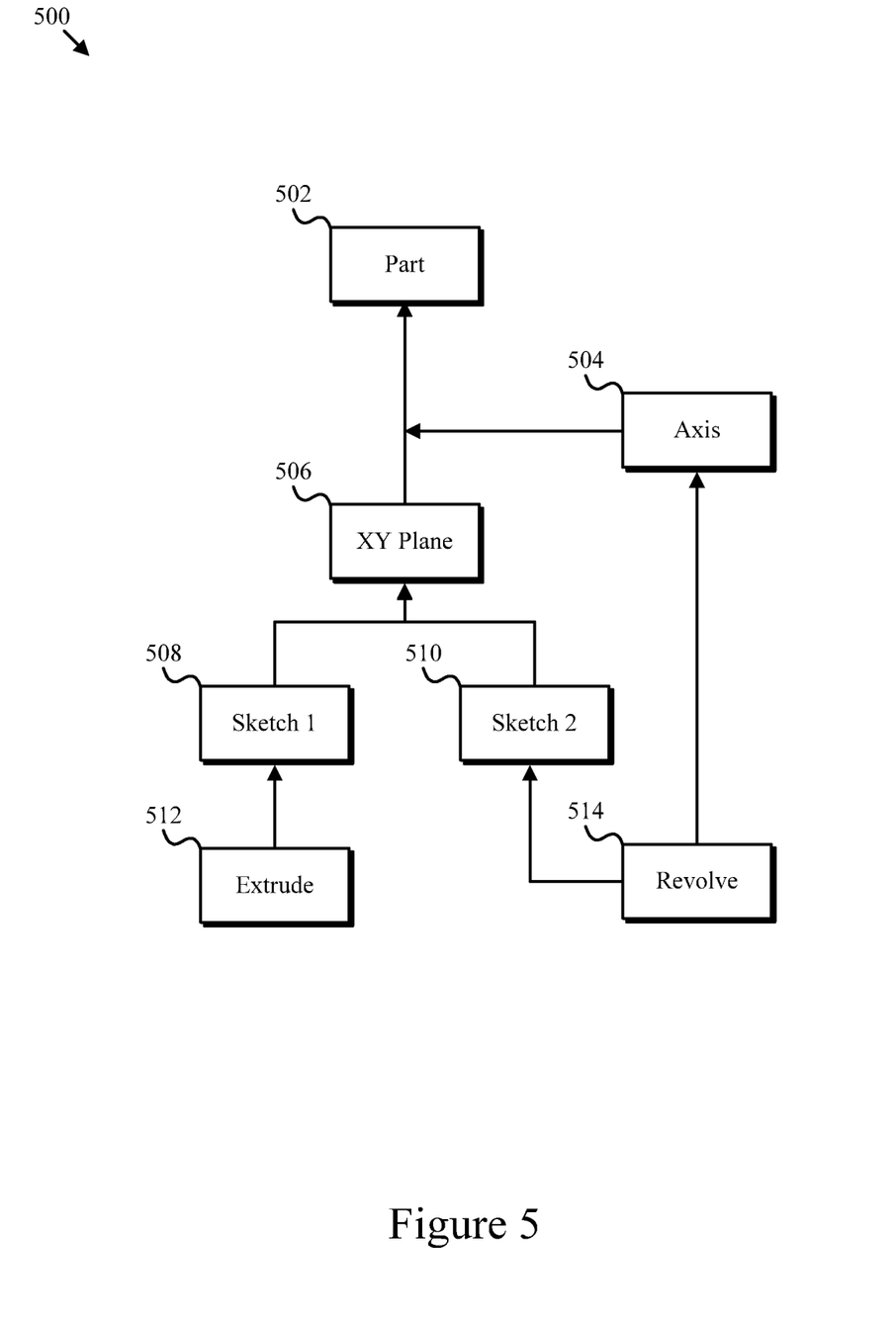
FIG. 5 is a block diagram depicting a hierarchical data structure within a design model in accordance with at least one embodiment of the present invention.

FIG. 5 is a block diagram depicting a hierarchical data structure 500 within a design model. Hierarchical data structure 500 may include a part node 502 at the root of the graph, an axis node 504, an XY plane node, two sketch nodes 508 and 510, an extrude node 512, and a revolve node 514. The nodes represent the features (e.g., geometries and operations) that constitute the part represented by part node 502 at the root of the graph. Hierarchical data structure 500 forms a consistent, hierarchical tree in which each node has an operational order beneath its parent. As such, hierarchical data structure 500 may be suitable for build-dependent hierarchy storage. Hierarchical data structure 500 may be a subtree of a larger design model, in which several parts comprise a build-dependent hierarchy of an assembly. As CAx clients combine the elements comprising a part or assembly, the CAx systems running on the clients may assign data nodes to be child nodes to a parent data node, and subsequently reassign a child data node to a different parent data node.

At step 304, one or more of the systems described herein may indicate an operational order for each data node that has a common parent. For example, ordering module 204 may, as part of server 106 in FIG. 2, indicate an operational order 216 for each data node 210 in directed acyclic graph 214 that has a common parent.

Ordering module 204 may indicate an operational order for each data node that has a common parent in any suitable manner. For example, ordering module 204 may indicate an operational order by storing a priority level in each node data structure that is a child node of a common parent. In another example, ordering module may set a link field in each child node of a common parent that links each child node to the next node in operational order.

In one embodiment, the model is stored on a server and a client requests a particular position within the operational order. For example, client 102 may request a particular position within operational order 216 from ordering module 204 for a particular data node 210. Ordering module 204 may assign an operational order to each child node of a common parent according to the request from the client. Ordering module 204 may then inform the client of the assigned operational order. If necessary, the client may then adjust the operational order in the local copy of the model database. Ordering module 204 may, when necessary, resolve conflicts between operational order requests from two or more clients submitting operational order requests for child nodes of a common parent and notify each client of the assigned operational order for the child nodes.

At step 306, one or more of the systems described herein may execute in the indicated operational order a CAx-related function for each data node. For example, operation module 206 may, as part of server 106 in FIG. 2, execute in the indicated operational order 216 a CAx function 218 for each data node 210 in directed acyclic graph 214.

Operation module 206 may execute CAx-related functions for each data node in the indicated operational order in a variety of ways. In some examples, systems described herein may include executing a dependency-related function according to the dependency references. For example, operation module 206 may utilize index and operational order fields in each data node to determine the order of operations for all data nodes in a hierarchy. The tree structure of the hierarchy may increase the efficiency of executing CAx-related functions for data nodes in the hierarchy by enabling the hierarchy tree to be partitioned into subtrees. The subtrees may be processed in parallel with different processors using algorithms that operate on subtrees.

In one embodiment, the dependency-related function may include checking for potential conflicts. Operation module 206 may perform a conflict checking and resolution operation on the hierarchical model of the engineering object or on a subtree within the hierarchical model.

Figure 6:
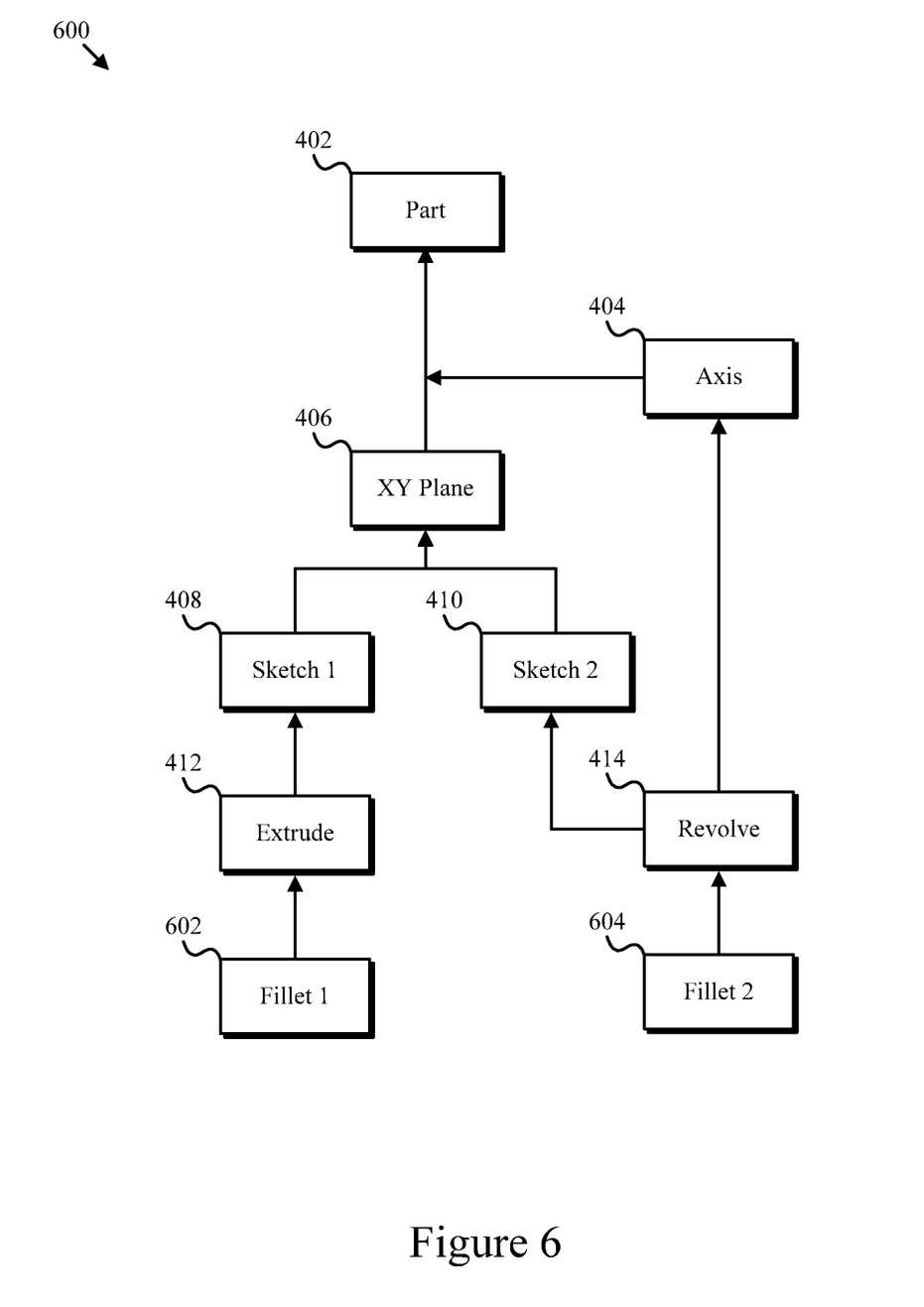
FIG. 6 is a block diagram depicting a hierarchical data structure within a design model in accordance with at least one embodiment of the claimed invention.

In one embodiment, data nodes that do not have a common parent are determined to not have a potential conflict. FIG. 6 is a block diagram depicting a hierarchical data structure 600 within a design model. Hierarchical data structure 600 includes the data nodes of hierarchical data structure 500 in FIG. 5, with the addition of two fillet operation data nodes 602 and 604. Because fillet operation node 602 and fillet operation node 604 have different parent nodes, a conflict checking and resolution operation performed by operation module 206 may determine that there is no potential conflict between the two nodes.

Figure 7:
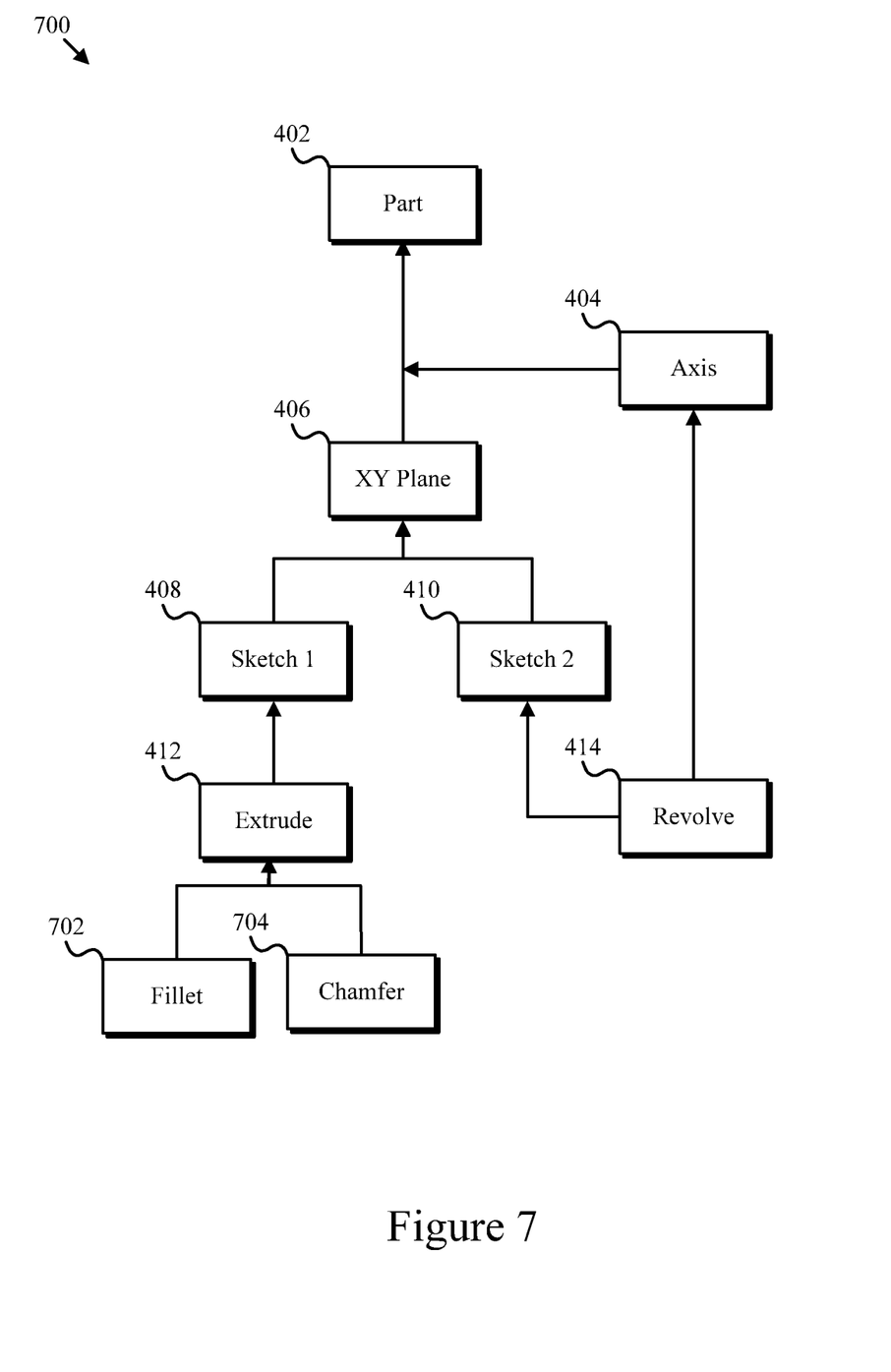
FIG. 7 is a block diagram depicting a hierarchical data structure within a design model in accordance with at least one embodiment of the claimed invention.

FIG. 7 is a block diagram depicting a hierarchical data structure 700 within a design model with a conflict between two operation data nodes, fillet node 702 and chamfer 704. If two clients were to separately add the two operation nodes, ordering module 204 may recognize that the order in which the two operations are performed may produce different geometries. Ordering module 204 may resolve the conflict by assigning the operation order for the two operation data nodes that results in the correct geometry.

Figure 8:
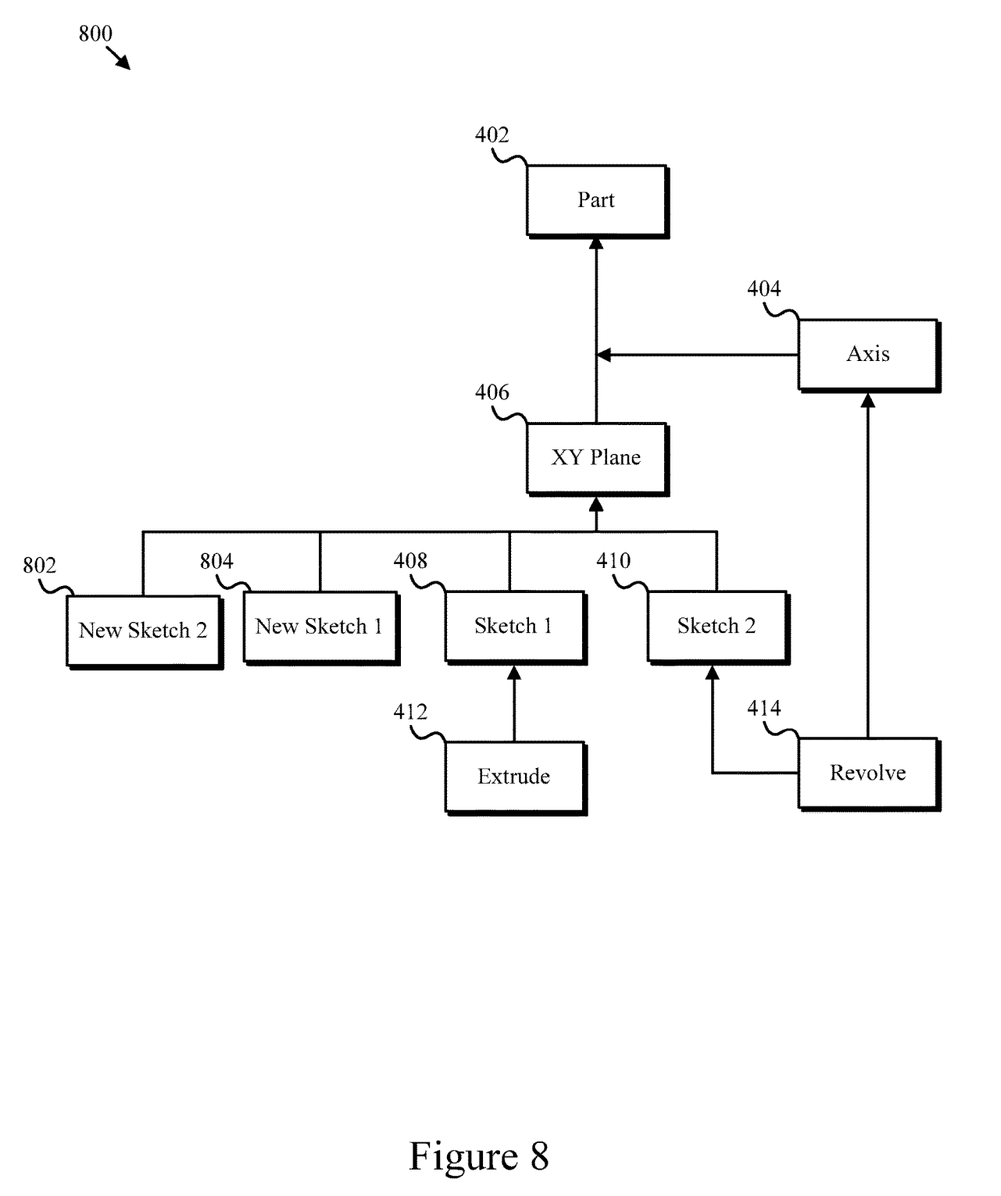
FIG. 8 is a block diagram depicting a hierarchical data structure within a design model in accordance with at least one embodiment of the claimed invention.

In some examples, operation order may be unimportant. FIG. 8 is a block diagram depicting a hierarchical data structure 800 within a design model. The additional sketch data nodes 802 and 804 may be added to the XY plane of the parent node in any order without conflict or incompatibility.

Figure 9:
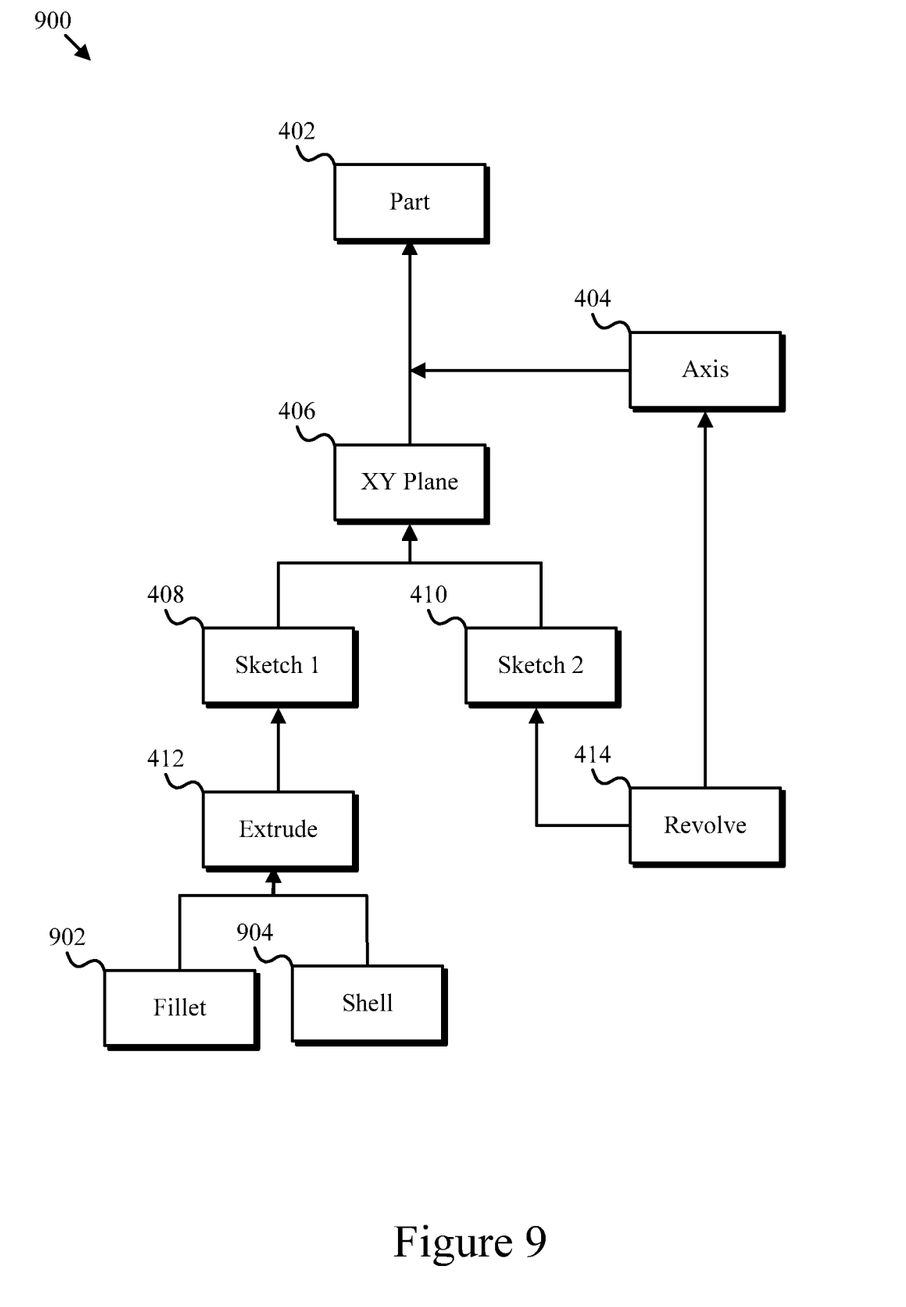
FIG. 9 is a block diagram depicting a hierarchical data structure within a design model in accordance with at least one embodiment of the claimed invention.

In some examples, operation order does not lead to a correct or incorrect build of a geometry, rather the operation order results in two correct, but different, geometries. For example, FIG. 9 is a block diagram depicting a hierarchical data structure 900 within a design model. The order in which the operations represented by fillet node 902 and shell node 904 are executed may result in two different geometries. In this example, ordering module 204 may assign an operational order according to the order in which the operation nodes were added to the hierarchical data structure. If the two operations were added to the hierarchical data structure by separate clients at approximately the same time, ordering module 204 may notify the clients of the potential ambiguity, so that the clients may determine the operational order that results in the intended design.

In one embodiment, the CAx-related function may include graphically rendering at least a portion of the model of the engineering object. FIG. 4 is a flowchart diagram depicting one embodiment of a method 400 for rendering an interoperable hierarchical model for conducting multiuser CAx operations. The steps shown in FIG. 4 may be performed by any suitable computer-executable code and/or computing system. In some embodiments, the steps shown in FIG. 3 may be performed by one or more of the components of system 100 in FIG. 1 or system 200 in FIG. 2.

By maintaining data nodes in a hierarchical tree graph in which child nodes of a common parent are assigned an operational order, systems and methods described herein create interoperable storage for engineering designs. For CAx tools that use build-dependent hierarchical storage, systems and methods described herein maintain an operational order for child nodes with a common parent, to provide a consistent view of the engineering object to all users. The build-dependent hierarchical storage model may also interoperate with build-independent CAx tools or non-hierarchical CAx tools The hierarchical storage model constructed and maintained by systems and methods described herein may also facilitate efficient rendering of all or a portion of an engineering model, as well as efficient and compliant rendering of database elements restricted under ITAR.

It should also be understood that this description is not intended to limit the invention. On the contrary, the example embodiments are intended to cover alternatives, modifications, and equivalents, which are included in the spirit and scope of the invention as defined by the appended claims. Further, in the detailed description of the example embodiments, numerous specific details are set forth in order to provide a comprehensive understanding of the claimed invention. However, one skilled in the art would understand that various embodiments may be practiced without such specific details.

Although the features and elements of the present example embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
   storing a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph;
   determining an operational order for each data node that has a common parent;
   indicating the operational order for each data node that has a common parent;
   presenting, according to the indicated operational order, a graphical rendering of least a portion of the model of the engineering object to a user; and
   wherein presenting the graphic rendering comprises at least one of:
      culling at least one data node of a node not being edited and
      culling at least one data node that is a child of a node not being edited.

2. The method of claim 1, wherein:
   the model is stored on a server; and
   a client requests a particular position within the operational order.

3. The method of claim 1, wherein indicating an operational order comprises storing a priority level.

4. The method of claim 1, further comprising executing a dependency-related function according to the dependency references.

5. The method of claim 4, wherein the dependency-related function comprises checking for potential conflicts.

6. The method of claim 5, wherein data nodes that do not have a common parent are determined to not have a potential conflict.

7. The method of claim 1, wherein each dependency reference comprises at least one of:
   a pointer;
   a handle;
   an index.

8. A system for an interoperable hierarchical model for conducting multiuser CAx operations, the system comprising:
   a storage module, stored in memory, that stores a model of an engineering object in a plurality of data nodes that are interconnected with a plurality of dependency references that specify one or more parent nodes for each non-root node of the plurality of data nodes, the plurality of data nodes and the plurality of dependency references corresponding to a directed acyclic graph;
   an ordering module, stored in memory, that:
      determines an operational order for each data node that has a common parent; and
      indicates the operational order for each data node that has a common parent;
   a rendering module, stored in memory, that presents, according to the indicated operational order, a graphical rendering of least a portion of the model of the engineering object to a user;
   wherein the rendering module, stored in memory, graphically renders at least a portion of the model of the engineering object by at least one of:
      culling at least one data node of a node not being edited and
      culling at least one data node that is a child of a node not being edited; and
   at least one physical processor configured to execute the storage module, the ordering module, and the rendering module.

9. The system of claim 8, wherein:
   the model is stored on a server;
   a client requests a particular position within the operational order.

10. The system of claim 8, wherein the ordering module indicates the operational order by storing a priority level.

11. The system of claim 8, the operation module executes a dependency-related function according to the dependency references.

12. The system of claim 11, wherein the dependency-related function comprises checking for potential conflicts.

13. The system of claim 12, wherein data nodes that do not have a common parent are determined to not have a potential conflict.

14. The system of claim 8, wherein each dependency reference comprises at least one of:
   a pointer;
   a handle;
   an index.

* * * * *